United States Patent
Leimer

(10) Patent No.: US 6,761,141 B2
(45) Date of Patent: Jul. 13, 2004

(54) VALVE STEM SEAL WITH BUILT-IN SPRUE

(75) Inventor: Mark Alan Leimer, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/315,444

(22) Filed: Dec. 10, 2002

(65) Prior Publication Data

US 2004/0107936 A1 Jun. 10, 2004

(51) Int. Cl.⁷ .................................... F02N 3/00
(52) U.S. Cl. ..................... 123/188.6; 277/502
(58) Field of Search ............... 123/188.6; 251/214; 29/888.4; 277/502, 924, 572, 575

(56) References Cited

U.S. PATENT DOCUMENTS 4,834,037 A 5/1989 Lafever
5,775,284 A * 7/1998 Kirchner et al. ......... 123/188.6
6,205,969 B1 * 3/2001 McArthy ................. 123/188.6

* cited by examiner

Primary Examiner—Tony M. Argenbright
Assistant Examiner—Katrina B. Harris
(74) Attorney, Agent, or Firm—Rader, Fishman & Grauer, PLLC

(57) ABSTRACT

A valve stem seal assembly includes a retainer with one or more built-in sprues, a cavity at one end, an annular flange on the opposite end, and a cylindrical interior passageway therebetween. The built-in sprues extend from the bottom surface of the cavity to the annular flange. When the valve stem seal assembly is fitted atop the valve guide, a gap is formed between the bottom surface of the cavity of the retainer and the top surface of the valve guide to accommodate manufacturing tolerances in the height of the valve guide. A jacket is integrally bonded to the retainer by introducing material into the cavity, through the built-in sprues, and out of the bottom of the annular flange. A method of manufacturing the valve stem seal assembly with one or more built-in sprues is disclosed.

16 Claims, 1 Drawing Sheet ively bonded to the retainer 12.
The jacket 14 includes an upper region 24 that encompasses
the cavity 18 of the retainer 12, an intermediate region 26
and an annular seal 28 on the opposite end of the cavity 18.
For sealing engagement of the moving valve stem 42, the

VALVE STEM SEAL WITH BUILT-IN SPRUE

TECHNICAL FIELD

The present invention relates to a valve stem seal assembly, and in particular to a seal for a valve stem seal assembly found in overhead valve internal combustion engines.

BACKGROUND OF THE INVENTION

Those skilled in the art will appreciate the manner in which intake and exhaust valves are employed in cylinder heads of internal combustion engines. In conventional overhead valve internal combustion engines, a pair of valves reciprocates in timed alternation to provide intermittent communication between the intake and exhaust manifolds and a combustion chamber. As is well known, the intake port of a combustion chamber is opened and closed by the reciprocating motion of at least one intake valve. The intake valve permits fuel mixed with air to flow into the combustion chamber. In addition, an internal combustion engine has at least one exhaust valve and associated exhaust port for releasing expended combustion gases into the atmosphere. Lubrication is provided to the upper portions of the valves. Because temperatures in the combustion chamber may approach or exceed 1000 degrees Centigrade, any lubricating oil exposed to these temperatures will vaporize or burn leaving behind deposits that may interfere with the proper sealing of the valves and cause rapid deterioration. Valve stem seal assemblies are used to seal against leakage of oil between each valve guide and its associated valve stem.

It is therefore necessary to provide seals around the upper region of the valve stems and along the valve guide down to the manifolds and combustion chamber. A typical valve stem seal takes the form of a cylinder partially closed at one end by the valve seal. The cylindrical region seats about the valve guide to maintain the valve seal stationary. An upper region of the valve stem is surrounded by the valve seal when the valve stem is fully inserted into the valve seal assembly.

Conventional valve seal assemblies comprise individual body and seal components that typically must be assembled into the valve seal assembly. Such multiple components and associated assembly increases the cost of the valve seal assembly. In some engines, unitary elastomeric valve stem seals are fitted over or atop each valve guide, wherein the seal component is frictionally mounted directly to the guide. Traditional manufacture of such seals has been only on a unitary batch basis, or via one batch at a time. Thus, although much progress has been achieved in the art of valve stem design and construction, cost-effective techniques for enhancement of strength of materials, along with streamlined manufacturing techniques remain areas in need of additional improvement.

SUMMARY OF THE INVENTION

The inventor of the present invention has recognized these and other problems associated with valve stem seals. To this end, the inventor has developed a valve stem seal assembly comprising of a retainer, including a cavity, a cylindrical passageway, an annular flange and having one or more built-in sprues, and a jacket having an upper region at one end, an annular seal at the opposite end and an intermediate region therebetween. The jacket is bonded to the retainer.

In another embodiment of the invention, a valve stem seal assembly comprises a retainer, including a cavity, a cylindrical passageway, an annular flange and having one or more built-in sprues, a jacket, and a gap. The gap is defined by a bottom of the cavity, a surface of the cylindrical passageway and a top surface of a valve guide to accommodate variances in valve guide height.

A manufacturing method is presented for manufacturing a valve stem seal assembly. The retainer is placed upon a tool plate that contains a circumferential groove. Elastomeric material is poured into the built-in sprues of the retainer, filling the circumferential groove on the tool plate, the built-in sprues and the cavity of the retainer. As the circumferential groove is filled with elastomeric material, the annular seal is formed. The jacket is formed as the elastomeric material fills the built-in sprues and the cavity. Finally, the elastomeric material is cured and the jacket is integrally bonded with the retainer.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
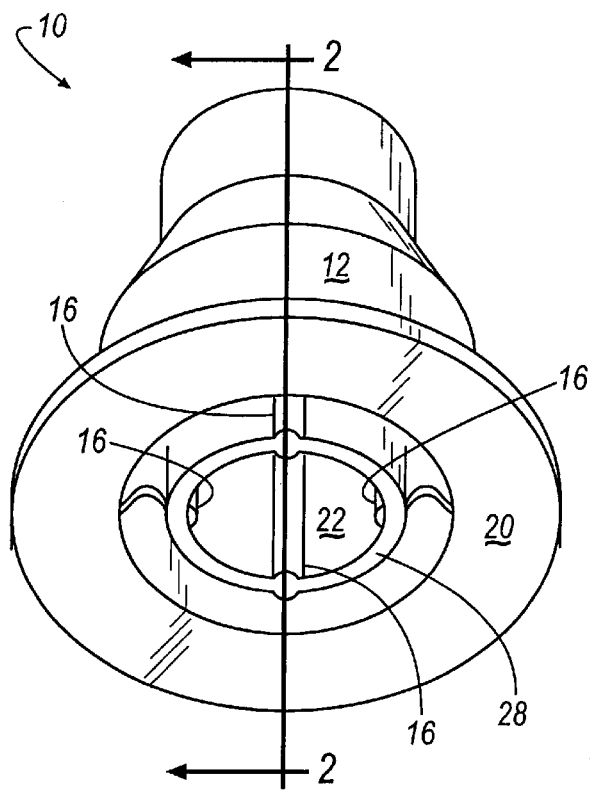
FIG. 1 is a perspective view of a valve stem seal with built-in sprues according to an illustrated embodiment of the invention.
Figure 2:
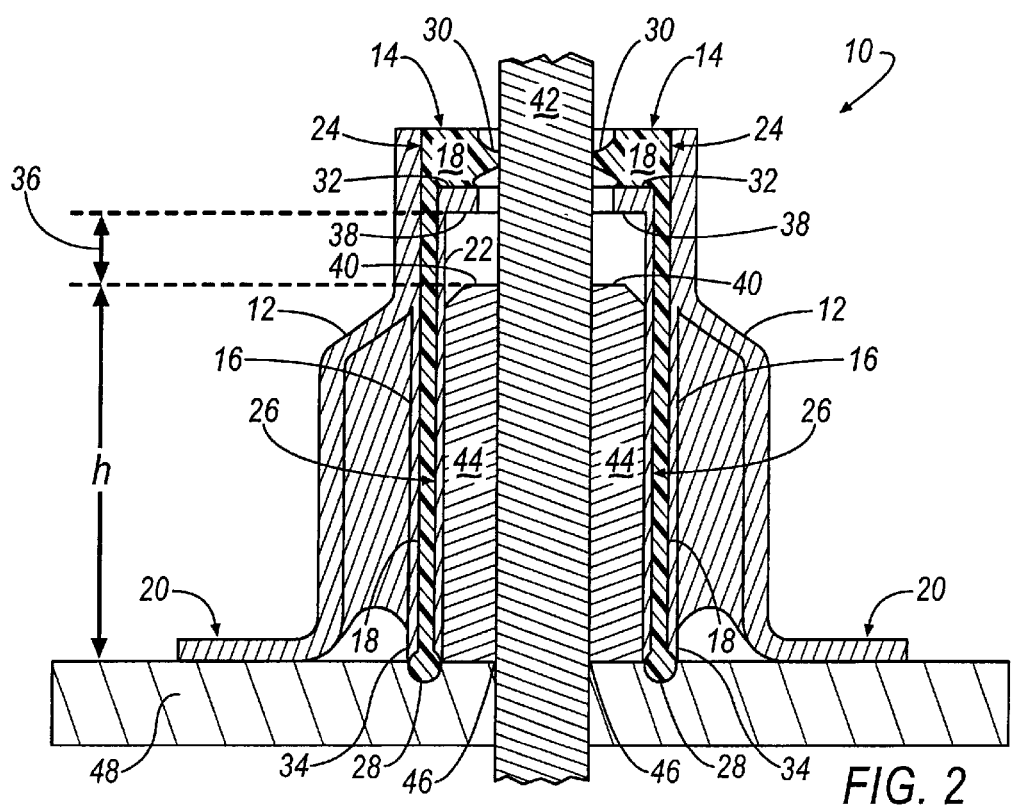
FIG. 2 is a cross-section view of the illustrated embodiment of the invention taken along line 2—2 of FIG. 1.

Referring now to FIGS. 1 and 2, a valve stem seal assembly is generally shown at 10. The valve stem seal assembly 10 is mounted and secured in position upon a valve guide 44 of an internal combustion engine (not shown.) The valve stem 42 is supported for reciprocal movement within the valve guide 44. The valve guide 44 is secured in, and extends longitudinally through an aperture 46 of a cylinder head (not shown) of the internal combustion engine.

The valve stem seal assembly 10 comprises of a retainer 12 and a jacket 14. The retainer 12 has one or more built-in holes or sprues 16, a cavity 18 at one end, an annular flange 20 at the opposite end of the cavity 18, and a cylindrical interior passageway 22 therebetween. In the illustrated embodiment, the built-in sprues 16 are symmetrically positioned at 90-degree intervals along the circumference of the interior passageway 22. The built-in sprues 16 extend vertically from the bottom surface 32 of the cavity 18 to the annular flange 20 allowing material to pass therethrough. In addition, the built-in sprues 16 are of a substantially uniform diameter along their length. However, the built-in sprues 16 can have a non-uniform diameter and can be non-circular in cross-section along their length. In addition, the invention can be practiced with any desired number of built-in sprues 16 and can be positioned at any desired non-symmetric interval along the circumference of the interior passageway 22. The retainer 12 can be formed from any suitable plastic material having high temperature strength and stability such as a polyester elastomeric material or similar plastics. In the illustrated embodiment, the retainer 12 is preferably formed from Nylon 4–6 material.

One aspect of the invention is that the jacket 14 is made of elastomeric material integrally bonded to the retainer 12. The jacket 14 includes an upper region 24 that encompasses the cavity 18 of the retainer 12, an intermediate region 26 and an annular seal 28 on the opposite end of the cavity 18. For sealing engagement of the moving valve stem 42, the upper region 24 of the jacket 14 is frictionally supported directly to the exterior surface of the valve stem 42. The upper region 24 of the jacket 14 forms a circumferentially extending sealing lip 30 that is adapted to engage the exterior surface of the valve stem 42. In this particular embodiment, the sealing lip 30 is frictionally and circumferentially supported directly on the valve stem 42. However, in other embodiments, depending on the operating conditions, a seal container (not shown) can be employed to secure the sealing lip 30 on the valve stem 42. The intermediate region 26 of the jacket 14 extends from the bottom surface 32 of the cavity 18 to the end 34 of the built-in sprues 16. The intermediate region 26 of the jacket 14 is defined by and encases the interior passageway 22 of the retainer 12. The annular seal 28 is adjacent one end of the intermediate region 26 of the jacket 14 and extends beyond the annular flange 20 of the retainer 12. Preferably, the annular seal 28 extends beyond the annular flange 20 at a substantially uniform distance. The annular seal 28 is adapted to frictionally engage the cylinder head 48 of the internal combustion engine. In the illustrated embodiment, shown in FIG. 1, the inner seal 28 is substantially circular in cross sectional shape. It will be appreciated that the annular seal 28 can be any so long as the retainer 12 properly seals against the cylinder head 48.

When the valve stem seal assembly 10 is fitted atop the valve guide 44, a gap 36 is formed within the valve stem seal assembly 10 between the bottom surface 38 of the cavity of the retainer 12 and the top surface 40 of the valve guide 44. The gap 36 allows for variances in the height, h, of the valve guide 44 that can occur during the manufacturing of the valve guide 44. For example, the valve stem seal assembly 10 can allow for variances in the height of the valve guide 44 of at least ±0.060 inches.

During the manufacturing of the valve seal assembly 10, the elastomeric material fills the cavity 18 of the retainer 12 and flows down the built-in sprues 16 forming the upper region 24 of the jacket 14, the intermediate region 26 of the jacket 14 and an annular seal 28. The annular seal 28 is formed by placing the annular flange 20 of the retainer 12 upon a tool plate with a circumferential groove (not shown). As the elastomeric material flows down the built-in sprues 16, past the annular flange 20, and fills the circumferential groove in the tool plate, thereby forming the annular seal 28. In addition, the jacket 14 is integrally bonded with the retainer 12.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A valve stem seal assembly, comprising:
   a retainer includes a cavity at one end, an annular flange at an opposite end and a cylindrical interior passageway therebetween;
   a jacket bonded to said retainer and having an upper region at one end, an annular seal at the opposite end and an intermediate region therebetween, and
   at least one built-in sprue positioned along the circumference of said cylindrical interior passageway.

2. A valve seal assembly as in claim 1, wherein said at least one built-in sprue extends vertically from a bottom surface of said cavity to said annular flange.

3. A valve seal assembly as in claim 1, wherein said at least one built-in sprue has a substantially uniform diameter.

4. A valve seal assembly as in claim 1, wherein said retainer is fabricated of a plastic material.

5. A valve seal assembly as in claim 4, wherein said plastic material comprises Nylon 4–6 material.

6. A valve stem seal assembly as in claim 1, wherein said jacket comprises an elastomeric material.

7. A valve stem seal assembly as in claim 1, wherein a gap is formed between said retainer and a top surface of a valve guide when said valve stem seal assembly is fitted atop the valve guide.

8. A valve stem seal assembly as recited in claim 1, wherein said at least one built-in sprues are symmetrically positioned at intervals along the circumference of the interior passageway.

9. A valve stem seal assembly, comprising:
   a retainer includes a cavity at one end, an annular flange at an opposite end and a cylindrical interior passageway therebetween;
   a jacket bonded to said retainer; and
   one or more built-in sprues extending from a bottom surface of said cavity to said annular flange.

10. A valve stem seal assembly as in claim 9, further comprising a gap defined by a bottom surface of said cavity and a top surface of a valve guide when said valve stem seal assembly is fitted atop the value guide, wherein said gap is adapted to accommodate variances in a height of said valve guide.

11. A valve stem seal assembly as in claim 9, wherein said one or more built-in sprues are positioned along the circumference of said cylindrical interior passageway.

12. A valve stem seal assembly as in claim 9, wherein said retainer is made of a plastic material.

13. A valve seal assembly as in claim 9, wherein said is jacket is made of an elastomeric material integrally bonded to said retainer.

14. A valve stem seal assembly as in claim 9, wherein said jacket has an upper region on one end, an annular seal on the opposite end and an intermediate region therebetween and wherein said upper region encompasses said cavity.

15. A valve stem seal assembly as in claim 9, wherein said jacket is an elastomeric material.

16. A method of manufacturing a valve stem seal comprising a retainer including at least one built-in sprues, and a jacket bonded to said retainer comprising the steps of:
   a) placing an annular flange of said retainer on top of a tool plate that contains a circumferential groove on surface of plate;
   b) positioning said retainer to properly receive an elastomeric material;
   c) pouring said elastomeric material into said built-in sprues, such that said elastomeric material fills said groove on said tool plate, said built-in sprues and a cavity of said retainer forming said jacket;
   d) curing said elastomeric material such that said jacket is bonded with said retainer.

* * * * *

UNITED STATES PATENT AND TRADEMARK OFFICE
CERTIFICATE OF CORRECTION

PATENT NO.    : 6,761,141 B2
DATED         : July 13, 2004
INVENTOR(S)   : Mark Alan Leimer It is certified that error appears in the above-identified patent and that said Letters Patent is hereby corrected as shown below:

Column 4,
Line 32, replace "value" with -- valve --:
Line 39, after the words, "wherein said" delete "is":
Line 49, replace "sprues" with -- sprue --.

Signed and Sealed this

Eleventh Day of January, 2005

JON W. DUDAS
*Director of the United States Patent and Trademark Office*